Dec. 8, 1931.  P. SWANSON  1,835,442

RAILROAD SWITCH STAND DOG

Filed April 22, 1931  2 Sheets-Sheet 1

Inventor
Peter Swanson.
Geo. Stevens
Attorney

Dec. 8, 1931.  P. SWANSON  1,835,442
RAILROAD SWITCH STAND DOG
Filed April 22, 1931    2 Sheets-Sheet 2

Inventor
Peter Swanson.
Geo. Stevens
Attorney

Patented Dec. 8, 1931

1,835,442

UNITED STATES PATENT OFFICE

PETER SWANSON, OF ELY, MINNESOTA

RAILROAD SWITCH STAND DOG

Application filed April 22, 1931. Serial No. 531,877.

This invention relates to switch stand dogs, and has special reference to a novel type of dog or catch and supporting bracket therefor.

The principal object is to provide a simple, inexpensive and effective device of this character, and one readily applicable to the present type of switch stand lever, the invention being an improvement upon a somewhat similar device illustrated in my Patent No. 1,647,484, dated Nov. 1st, 1927.

Another object is to provide means whereby the locking dog or catch is automatically engaged with the lug of the switch stand when the operating lever is down in its closed position.

Other minor objects and adavantages of the invention will appear in the following description thereof.

Referring now to the accompanying drawings, forming part of this application, and wherein like reference characters indicate like parts:

1 represents a common switch stand lever, bifurcated at its pivotally mounted end, forming the spaced like members 2, and adjacent which is formed the vertically elongated slot 3 for the reception of the lug 4 of the switch stand which is shown in dotted lines. This lug 4 as is well known to those versed in the art is provided with a hole indicated at 5 for the reception of the finger like end 6 of the dog for securely holding same in cooperative relation, the same being similar in such respects to the device shown in my former patent above referred to.

Figures 3, 4:
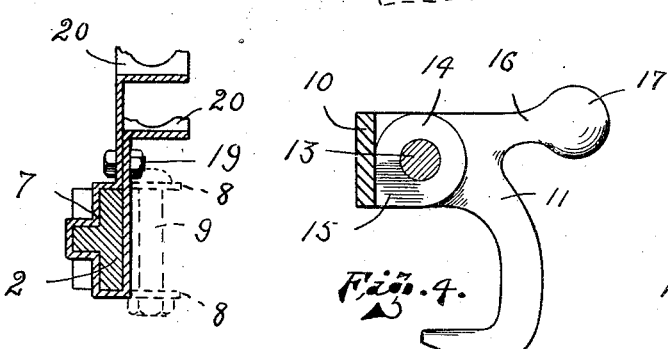
Figure 3 is a reduced vertical section through that portion of the dog bracket which is clamped to the lever of a still further modified form of bracket.
Figure 4 is an end elevation of the dog within the bracket, the rear wall of the latter being shown in section.

The present invention resides in the specific form of dog and bracket 10 therefor, the latter comprising an angularly shaped piece of preferably thin metal formed upon its innermost end to fit snugly about the outer ribbed face of one of the members 2 of the handle 1, as clearly illustrated at 7 in Figure 3 of the drawings, there being, in this former instance, a pair of spaced projecting lugs shown at 8, through which the clamping bolt 9 extends, and by which bolt the bracket is held tightly to one member 2 of the handle.

The free end of the bracket 10 is bent outwardly and downwardly to a proper position for supporting the dog 11 so that the finger end thereof will traverse the handle transversely the latter above and centrally of the slot 3 therein, and is provided with the two laterally projecting spaced members 12 intermediate of which the dog 11 is pivotally mounted and for which pivotal support is provided by the bolt 13 held in position either by a nut or cotter, as desired. The dog may be so mounted as to freely rotate on the bolt, or the bolt freely rotate in the bracket, as desired. However, the hub 14 of the dog is so formed as to provide an eccentric like stop indicated at 15, Fig. 4, and, when the finger 6 of the dog is transverse the slot 3 in the lever in holding position in respect to the lug 4, the stop will impinge the inner wall of the back of the bracket so as to insure the proper limiting of the lower locking motion of the dog.

At substantially right angles to the finger portion of the dog is formed integrally therewith the weighted handle portion 16, the weight or knob being shown at 17. This handle and its weight are designed to bias the dog in particularly its locking position, or in lieu of this the crook in the dog itself may be of abnormal size to accomplish like results except that the convenience of the portion 16 acting as a handle for the dog would be lost.

Figure 2:
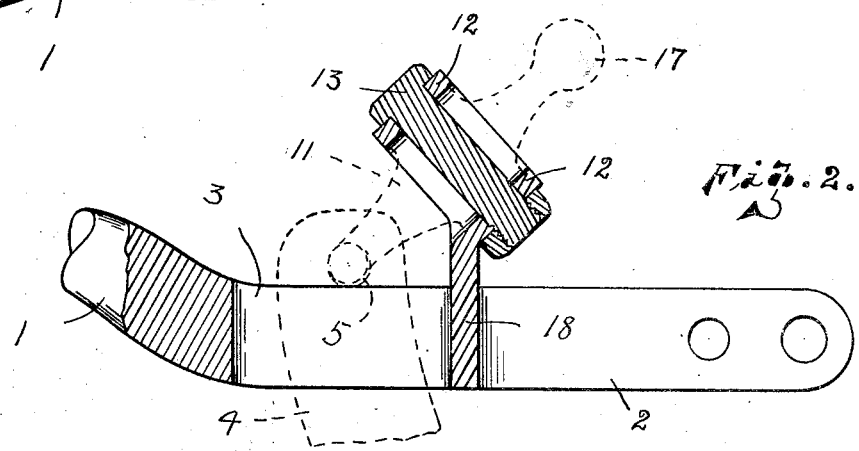
Figure 2 is a modified form of bracket for the dog.

In Figure 2, I have illustrated a similarly shaped dog supporting bracket as formed integrally with the lever, it being an upward extension of the division wall 18 intermediate of the slot 3 and the bifurcated portion of the handle, this being a construction, of course, adaptable to the manufacture of new handles. However, the dog would function when associated therewith in all respects similar to that when in the removable bracket just described.

Figure 1:
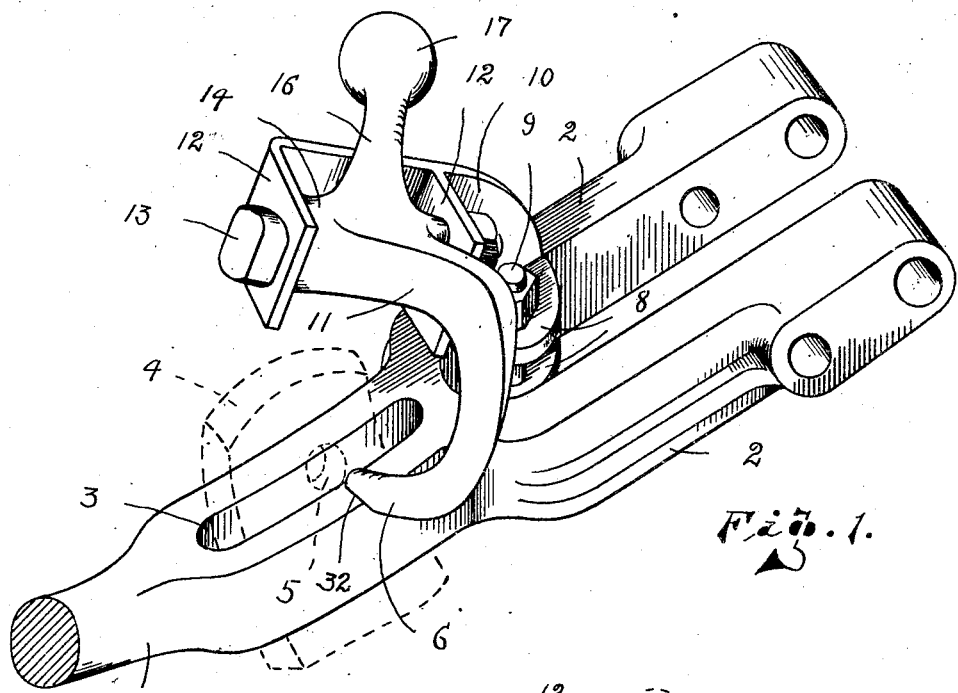
Figure 1 is a perspective view of one embodiment of the invention as applied to a common switch stand lever as found in what is known as yard inside switches.

In Figure 3, I have illustrated a still further modification of the removable or portable bracket which anticipates a structure wholly surrounding one of the members 2, and being held together as by one or more bolts illustrated at 19, there being one of the transverse members 20 corresponding to the members 12 in the type shown in Figure 1 at either end of the folded sheet metal bracket.

If the form of bracket illustrated in Figure 3 is employed, it is obvious that the same would have to be sprung open and slipped over the member 2 of the handle into position before the bolts 19 are put into place, whereas in the form shown in Figure 1 the lugs 8 are spaced the proper distance apart to slide over the member 2 and become clamped thereonto by the bolt 9, as previously described.

Figure 5:
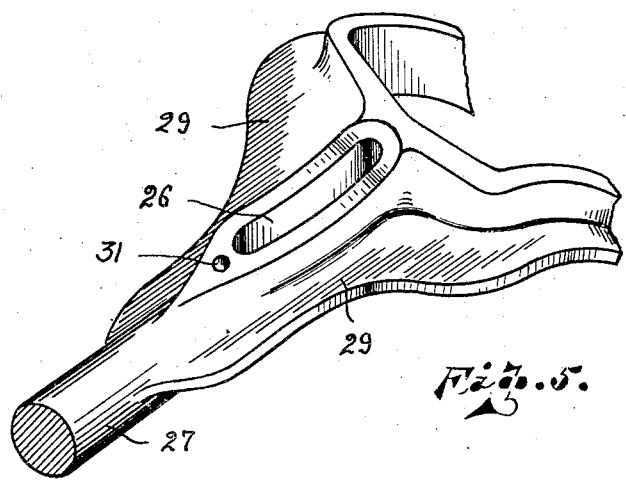
Figure 5 is a fragmental perspective view of a slightly different shaped switch handle.
Figures 6, 7:
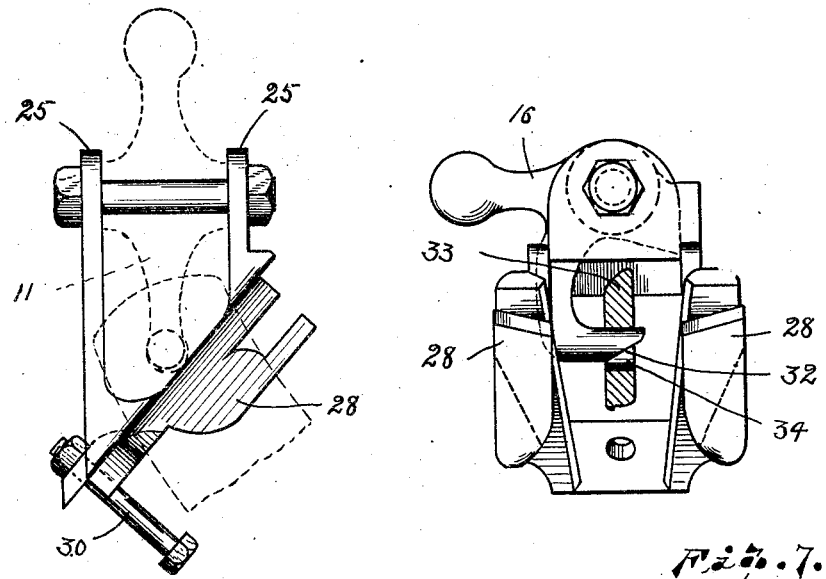
Figure 6 is a side elevation of a slip bracket for the locking dog designed to be slidably applied to such a lever as shown in Figure 5.
Figure 7 is an elevation of the slip bracket shown in Figure 6 as viewed from the switch stand side thereof.

In Figure 5 is illustrated a modified form of switch handle and a style frequently encountered in the art. To this type of handle I have shown as being particularly applicable a slip bracket shown in Figures 6 and 7, it having the upstanding spaced lugs 25 intermediate of which the dog, as previously shown, is mounted and operable transverse the slot 26 in the handle 27. This bracket has depending therefrom the jaw-like projection 28 on either side of the inclined bottom thereof so as to slidably engage about the webs 29 upon either side of the handle 27, and there be held in position by the bolt 30 passing through the lower portion of the bracket and the handle as by way of the hole 31 formed in the handle for such purpose, or, if space permitted, similar attachment could be made directly through the lower portion of the slot 26 in the handle.

The automatic engagement of the locking dog with the switch stand lug when the switch handle is lowered without the dog being manually manipulated is accomplished by forming the free lug engaging end of the dog inclined as at 32 so that as the similarly inclined end 33 of the lug engages said terminal of the dog as the handle is pushed downwardly, the dog will swing outwardly until the end of the lug has passed, and then the hole 34 in the lug will occur in the path of the dog and the latter by gravity become engaged therein.

Thus I have illustrated three different types of removable dog supporting brackets so that the invention is obviously applicable to different forms of handles, and the same may be still further modified without departing from the spirit of the invention.

Having thus described my invention, what I claim and desire to secure by Letters Patent, is:

1. In a switch stand lock, the combination with the hand lever of the switch and a lug having a hole therein, of a gravity dog pivotally carried by the lever including a depending hook-like portion for cooperative engagement with said hole, and an upstanding weighted handle portion to assist in biasing the dog toward its locked position.

2. The combination with a switch stand having a pivotally mounted operating handle attached thereto, of a bracket carried by said handle having spaced projecting members, and a gravity dog pivotally mounted intermediate of said members.

3. The combination with a switch stand having a pivotally mounted operating handle attached thereto, of a bracket carried by said handle having spaced projecting members, a gravity dog pivotally mounted intermediate of said members, and a weighted handle for biasing the dog toward its locked position.

4. The combination with a switch stand having a pivotally mounted operating handle attached thereto, of a bracket carried by said handle having spaced inwardly projecting members, a gravity dog pivotally mounted intermediate of said members, a weighted handle for biasing the dog toward its locked position, and a stop engageable with the bracket for limiting the lowermost throw of the dog.

5. A dog bracket for a switch stand lever, the latter being bifurcated at one end, comprising an angularly shaped member having clamping means at one end for anchoring engagement to one of the spaced members of the lever and means for pivotally supporting the dog in the other end.

6. In combination a bracket for a lever of a switch stand, said lever being bifurcated at one end and said bracket being adjacent the union of the spaced members with the remainder of the lever, and a dog pivotally mounted within the bracket and having a weighted handle fixed thereto for biasing it toward its locked position.

7. A dog bracket for a switch stand lever, the latter being bifurcated at one end, comprising an angularly shaped member having clamping means at one end for anchoring engagement to the lever, and means for pivotally supporting the dog in the other end.

8. The combination with a switch stand having a lug with a hole therein, extending therefrom for cooperative engagement with the switch handle, of a bracket carried by the handle, a gravity dog pivotally mounted upon the bracket, the free terminal of said dog being so shaped as to automatically engage the hole in the lug when the handle is lowered to extreme position.

In testimony whereof I affix my signature.

PETER SWANSON.